United States Patent Office 2,996,524
Patented Aug. 15, 1961

2,996,524
17α LOWER ALKYL-2-ANDROSTEN-17β-OL
Max N. Huffman, Colorado Springs, Colo., assignor to Lasdon Foundation, Inc., Yonkers, N.Y., a corporation of Delaware
No Drawing. Filed Mar. 20, 1961, Ser. No. 96,678
9 Claims. (Cl. 260—397.5)

This invention relates to steroids of the 2-androstene series and to the production thereof. More particularly, this invention relates to 2-androsten-17β-ol compounds containing hydrocarbon substituents in the 17α-position. These compounds have the following general structural formula

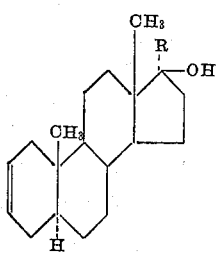

wherein R is a lower aliphatic hydrocarbon radical, such as methyl, ethyl, n-propyl, isopropyl, butyl, amyl, isoamyl, allyl, crotyl, vinyl, ethynyl and methylethynyl.

The compounds of this invention are physiologically active even when administered by mouth. They are powerful androgens as well as stimulators of the reticuloendothelial system and suppressors of pituitary gonadotropin in mammals. For instance, 17α-methyl-2-androsten-17β-ol is nearly as powerful an androgen as methyl testosterone when given orally to castrate male rats. 17α-ethyl-2-androsten-17β-ol causes suppression of pituitary gonadotropin in intact male rats with increase in muscle strength. Similarly, 17α-vinyl-2-androsten-17β-ol exerts a powerful suppression on pituitary gonadotropin in intact male rats with mild stimulative effect on muscle growth. 17α-isopropyl-2-androsten-17β-ol exhibits a remarkable stimulative effect on the reticulo-endothelial system of rats and mice, while producing very weak androgenic activity in intact male rats. 17α-allyl-2-androsten-17β-ol has a similar action, but, perhaps to a lesser degree.

It is an object of this invention to produce and to provide a method for producing 2-androsten-17β-ol compounds having hydrocarbon radicals in the 17α-position. It is a further object to produce steroids of the foregoing type which are useful as androgens, pituitary gonadotropin suppressors, reticulo-endothelial stimulants and muscle growth stimulants. It is a further object to produce such steroids which are biologically active when administered orally, rather than by injection. These and other objects are apparent from and are achieved in accordance with the following disclosure.

The compounds of the foregoing type are produced from 2-androsten-17-one, which was first prepared by Hirschmann, Journal of Biological Chemistry, vol. 136, pp. 483 et seq. (1944). 2-androsten-17-one, when treated with organometallic reagents wherein the organic radical is a hydrocarbon radical of the type disclosed above, is converted to 2-androsten-17β-ol derivatives containing a hydrocarbon constituent in the 17α-position. The organometallic reagent can be a Grignard reagent, an alkali metal acetylide, or an alkyl alkali metal derivative such as butyllithium. The reaction is illustrated by the following general equation wherein R has the meaning given hereinabove and M represents halomagnesium or alkali metal

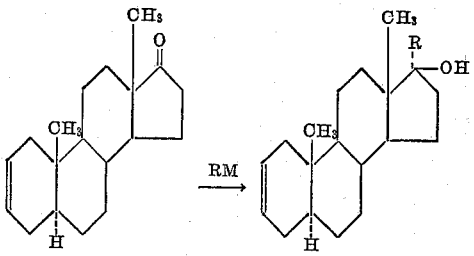

The reaction is conducted in a suitable solvent for an organometallic reagent, such as ethyl ether, tetrahydrofuran, butyl ether, toluene and the like, at a low temperature in the range of 0° to 50° C. using an excess of the organometallic reagent. The reaction mixture is then diluted with ice water and the steroid isolated from the organic solvent and purified, if necessary, by crystallization.

The invention is disclosed in further detail by means of the following examples which are provided merely for the purpose of illustrating the invention. It will be appreciated by those skilled in the art that numerous modifications in equivalent materials and operating conditions can be made without departing from the invention as disclosed herein.

EXAMPLE 1

*17α-methyl-2-androsten-17β-ol*

To a solution of 2.0 grams of 2-androsten-17-one in 300 ml. of anhydrous ether was added over a period of five minutes 80 ml. of 3 M methylmagnesium bromide in ethyl ether. The resulting solution was refluxed for one hour, then poured into a liter of ice water which contained 40 ml. of concentrated hydrochloric acid. The ether layer was separated and washed with three 400-ml. portions of water. The ether was removed by evaporation on a steam bath and the residue of 17α-methyl-2-androsten-17β-ol was recrystallized from aqueous acetone and had a melting point of 147° C.

EXAMPLE 2

*17α-ethyl-2-androsten-17β-ol*

This compound was prepared by the procedure of Example 1 using 3.0 grams of 2-androsten 17-one in 500 ml. of anhydrous ether and 120 ml. of 3 M ethylmagnesium bromide in anhydrous ether. After recrystallization from methanol, the 17α-ethyl-2-androsten-17β-ol melted at 101.5–102° C.

EXAMPLE 3

*17α-propyl-2-androsten-17β-ol*

A solution of n-propylmagnesium iodide was prepared from 6.1 grams of magnesium and 42.5 grams of n-propyl iodide in anhydrous ether. The solution of n-propylmagnesium iodide so formed was added over 10 minutes to a solution of 3 grams of 2-androsten-17-one in 300 ml. of anhydrous ether. The mixture was refluxed for 1.5 hours and then poured into a mixture of one liter of ice water containing 40 ml. of concentrated hydrochloric acid. A liter of ether was added and the ethereal solution separated, washed with ice water and evaporated on the steam bath. The residue of 17α-propyl-2-androsten-17β-ol was recrystallized from 70% acetone and absolute methanol and melted at 152° C.

EXAMPLE 4

*17α-isopropyl-2-androsten-17β-ol*

A Grignard reagent was prepared from 23.7 grams of isopropyl bromide and 5.6 grams of magnesium. It was added to a solution of 3 grams of 2-androsten-17-one in 300 ml. of anhydrous ether and the resulting mixture refluxed for 1.5 hours. The mixture was decomposed with a liter of ice water containing 40 ml. of concentrated hydrochloric acid, diluted with 600 ml. of ether and the ether phase was separated, washed with water and evaporated to dryness. The residue of 17α-isopropyl-2-androsten-17β-ol was recrystallized from a mixture of methanol and acetone followed by recrystallization from methanol, yielding crystals melting at 105° C.

EXAMPLE 5

17α-isopentyl-2-androsten-17β-ol

A solution of isopentyl magnesium bromide was prepared from 6.1 grams of magnesium and 37.76 grams of 1-bromo-3-methyl-butane in anhydrous ether. To this solution was added 3 grams of 2-androsten-17-one, and the resulting mixture was refluxed for 1.5 hours and then poured into a liter of 2 N ammonium chloride solution. The ether phase was separated, washed with water and dried with anhydrous sodium sulfate and evaporated on the steam bath. The residue of 17α-isopentyl-2-androsten-17β-ol was recrystallized from aqueous methanol and melted at 63–64° C.

EXAMPLE 6

17α-allyl-2-androsten-17β-ol

A solution of allylmagnesium bromide in ether was prepared from 12.6 grams of magnesium and 60.5 grams of allyl bromide, the temperature being kept between 3–8° C. To this solution was added 3 grams of 2-androsten-17-one in 200 ml. of dry ether, the temperature being maintained below 6° C. After the addition was complete, the mixture was stirred for two hours at 6–10° C. and for three hours at 20–25° C. The reaction mixture was decomposed with a liter of ice water containing 40 ml. of hydrochloric acid and 500 ml. of ether was added to the mixture. The ether solution was separated, washed with water and evaporated on the steam bath. The residue of 17α-allyl-2-androsten-17β-ol was recrystallized from methanol, and the product melted at 99–100° C.

EXAMPLE 7

17α-vinyl-2-androsten-17β-ol

To a stirred slution of 3.0 grams of 2-androsten-17-one in 100 ml. of anhydrous tetrahydrofuran at 0° C. was added dropwise 200 ml. of 1 N vinylmagnesium chloride solution over a period of 15–20 minutes. The resulting solution was stirred at 0° C. for 20 minutes and then allowed to warm to room temperature, followed by reflux with stirring for two hours. The reaction mixture was then chilled in ice and a solution of 40 ml. of concentrated hydrochloric acid in 1000 ml. of ice water was added dropwise. Approximately a liter of ether was added and the organic layer was separated, washed with water, dried with anhydrous sodium sulfate and evaporated. The residue of 17α-vinyl-2-androsten-17β-ol was crystallized from aqueous acetone and a mixture of methanol and hexane and melted at 112.5–113.5° C.

EXAMPLE 8

17α-ethynyl-2-androsten-17β-ol 1.2 grams of potassium was dissolved in 30.5 ml. of anyhdrous t-amyl alcohol. A solution of 1.1 grams of 2-androsten-17-one in 40 ml. of anhydrous toluene was added and nitrogen was passed through the mixture to dispel air. The resulting solution was stirred for 15 hours while a slow stream of purified anhydrous acetylene was bubbled through. At the end of this period, 300 ml. of ice water was added. The pH was adjusted to 1 with 50% aqueous hydrochloric acid. The resulting solution was distilled to remove all volatile organic materials. It was cooled to 0° C., extracted with ether, and the ether extract was washed with water, dried with sodium sulfate and evaporated. The residue of 17α-vinyl-2-androsten-17β-ol was recrystallized from aqueous acetone and melted at 140.5–141° C.

What is claimed as new and is desired to be secured by Letters Patent of the United States is:

1. A steroid of the formula

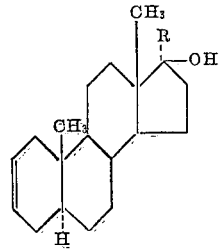

wherein R is a lower aliphatic hydrocarbon radical.
2. 17α-methyl-2-androsten-17β-ol.
3. 17α-ethyl-2-androsten-17β-ol.
4. 17α-propyl-2-androsten-17β-ol.
5. 17α-isopropyl-2-androsten-17β-ol.
6. 17α-isopentyl-2-androsten-17β-ol.
7. 17α-allyl-2-androsten-17β-ol.
8. 17α-vinyl-2-androsten-17β-ol.
9. 17α-ethynyl-2-androsten-17β-ol.

References Cited in the file of this patent

UNITED STATES PATENTS 2,806,030    Ringold et al.           Sept. 10, 1957
2,838,530    Colton                 June 10, 1958

OTHER REFERENCES

Fieser et al.: Steroids, 1959 ed., p. 519, Reinhold Pub. Co., New York, N.Y. (Copy of publication in Sci. Library.)

Notice of Adverse Decision in Interference

In Interference No. 92,401 involving Patent No. 2,996,524, M. N. Huffman, 17α lower alkyl-2-androsten-17β-ol, final judgment adverse to the patentee was rendered Sept. 29, 1964, as to claims 1, 2 and 9.

[*Official Gazette November 24, 1964.*]